United States Patent [19]
Hayssen, III et al.

[11] Patent Number: 5,630,113
[45] Date of Patent: May 13, 1997

[54] METHOD AND APPARATUS FOR REDUCING JITTER ACCUMULATION IN A SERIES OF REPEATING DEVICES

[75] Inventors: Carl G. Hayssen, III, Andover, Mass.; Stanley P. Sassower, Nashua, N.H.; Steven E. Archambault, Haverhill, Mass.

[73] Assignee: Ungermann-Bass, Inc., Santa Clara, Calif.

[21] Appl. No.: 644,803

[22] Filed: Jan. 22, 1991

[51] Int. Cl.$^6$ .................................................. G06F 11/14
[52] U.S. Cl. ...................................... 395/558; 395/183.19
[58] Field of Search ................................. 370/17, 85.21, 370/85.5, 105.3; 395/200, 550; 340/825.05, 825.06, 825.07, 825.14; 375/4

[56] References Cited

U.S. PATENT DOCUMENTS

| | | | |
|---|---|---|---|
| 4,506,360 | 3/1985 | Kryskow, Jr. et al. | 370/85.4 |
| 4,593,280 | 6/1986 | Grow | 340/825.05 |
| 4,876,683 | 10/1989 | Suzuki | 370/97 |
| 4,984,233 | 1/1991 | Nakayashiki et al. | 370/16 |
| 5,023,871 | 6/1991 | Nakayashiki et al. | 370/85.5 |
| 5,052,022 | 9/1991 | Nishita et al. | 375/4 |
| 5,090,025 | 2/1992 | Marshall et al. | 375/4 |

OTHER PUBLICATIONS

Marshall, et al. "Improved Synchronization for IEEE 802.5 Network Systems", no date.
PCM Jitter Attenuator Part No. CS61600, Crystal Semiconductor Corporation (Sep. 1987).

*Primary Examiner*—Thomas G. Black
*Assistant Examiner*—John C. Loomis
*Attorney, Agent, or Firm*—Townsend and Townsend and Crew LLP

[57] ABSTRACT

A data stream is received by a first in a series of repeating devices and retransmitted from repeating device to repeating device. As the data stream is retransmitted, the data stream accumulates jitter. A jitter reduction apparatus therefore is used after a series of repeating devices to substantially reduce the accumulated jitter. The jitter reduction apparatus receives the data stream, stores the recognized data, then retransmits the data using a recovered clock signal. According to one embodiment, the recovered clock signal is the clock signal of the original data transmission. According to another embodiment, the recovered clock signal is derived from the data stream as input to the first of the series of repeating devices. Such derived clock signal serves as an estimate of the original data source clock signal. By using a recovered clock signal (e.g., original or derived) rather than the input data stream of the jitter reduction apparatus, the jitter reduction apparatus substantially reduces or eliminates accumulated jitter. According to various configurations of groups of repeating devices and jitter reduction apparatuses, a linear or hierarchy approach to jitter reduction may be implemented.

17 Claims, 12 Drawing Sheets

| FIG. 6A. |
| FIG. 6B. |

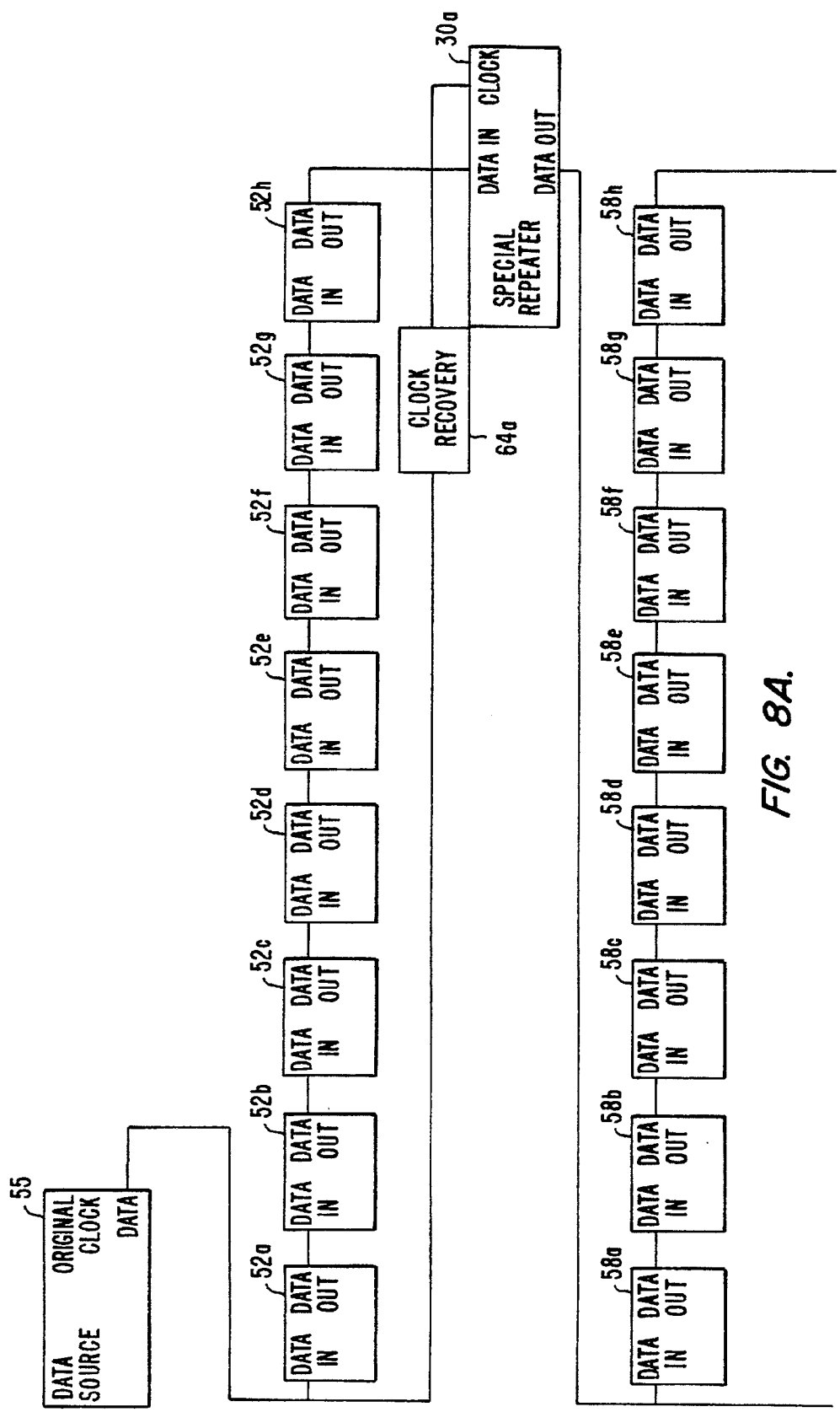

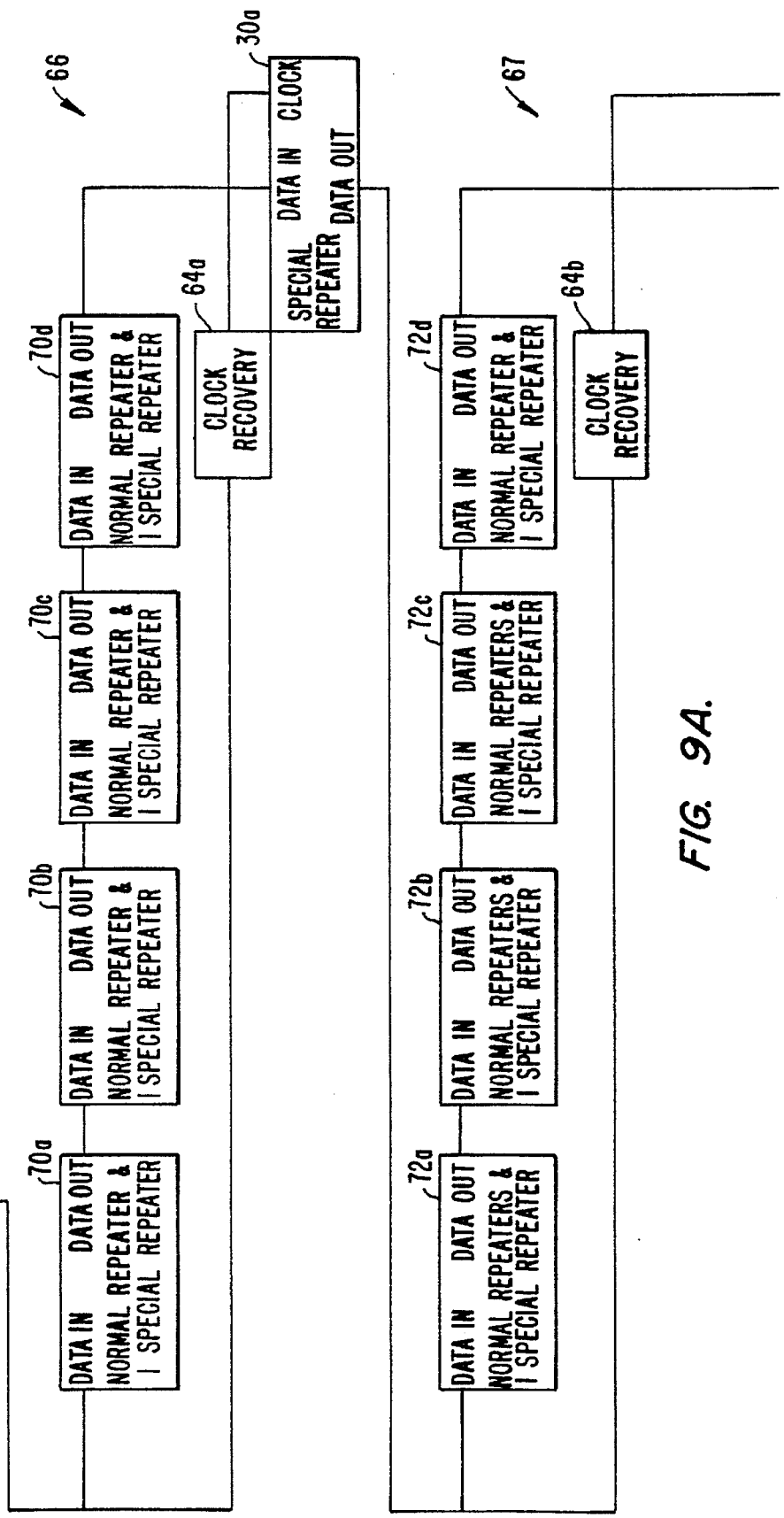

METHOD AND APPARATUS FOR REDUCING JITTER ACCUMULATION IN A SERIES OF REPEATING DEVICES

BACKGROUND OF THE INVENTION

This invention is related to a method and apparatus for reducing jitter accumulation in a series of repeating devices along a physical communication channel. Jitter refers to the phase instability of a communication signal traversing a physical communication channel. Jitter is undesirable for systems in which phase stability and data synchronization of repeated data is desired (i.e., token ring local area network).

A data stream is received and retransmitted along a physical communication channel by a repeating device. To generally synchronize data transmission along the channel, the repeating device may, for example, derive the output clocking rate from the clock signal for the incoming data stream. According to such an approach, however, the communication as forwarded from repeating device to repeating device may accumulate jitter. The jitter appears as phase variations among the data pulses forming the communication. During successive repeating operations, jitter may accumulate beyond acceptable tolerances. Excessive jitter may cause the communication signal to be inaccurately recognized by a repeating device or network component. Accordingly, there is a need for reducing jitter accumulation.

A basic function of a repeating device is to receive and retransmit a communication signal along a physical communication channel. As the communication signal traverses the physical communication channel from a source, the signal loses strength. Correspondingly, the data pulses forming the signal attenuate and become distorted. Such attenuation and distortion characteristics limit the physical length of a communication channel. In practice, the limit depends upon the type of physical communication channel (i.e., twisted-wire-pair, coaxial, fiber-optic) and the type of transmission technique (i.e., baseband, broadband).

To enable the communication channel to extend beyond the limited distance and avoid the corresponding attenuation and distortion problems, a device for repeating the signal is used. The repeating device receives the communication signals, then retransmits the signals at substantially the original strength and sharpness. A conventional Repeater simply receives the signal, then retransmits the improved signal without processing or modifying the signal contents. Such a repeater is common for inter-continental cable transmissions.

FIG. 1 shows a block diagram of a conventional repeater 10 including a receiver 12, a data recovery circuit 14, buffer 16 and a transmitter 18. The data stream is input to the receiver 12, with the component pulses recognized by the data recovery circuit 14 and stored in the buffer 16. The transmitter 18 then retransmits the component data pulses at a restored amplitude and sharpness.

A repeating device, also may be a station on a network which receives the communication signals, then retransmits the signals at substantially the original strength and sharpness. For example, according to the standard protocol of a token ring LAN (IEEE standard 802.5), a communication referred to as a packet is passed from one station to the next station in physical sequence along a ring of stations. Each station transmits the packet to the next station regardless of the packet destination. Thus, each station is a repeating device. A station in a token ring network which provides the function of a repeating device includes the components 12, 14, 16, 18 of a conventional repeater 10 to receive, recognize and retransmit the communication.

The station embodiment of a repeating device may or may not modify the packet contents. According to the token ring architecture, a destination station sets status bits to acknowledge that the destination address was recognized and/or that the data was copied. In addition, any station in the ring may mark the packet with a transmission error bit.

Accordingly, a repeating device includes a device which receives a communication signal over a physical communication channel, then retransmits the signal with or without processing the signal contents.

The jitter tolerance of a repeating device limits the number of repeating devices which may be connected in series. For a token ring architecture in which each station is a repeating device, jitter is a significant problem. Accordingly, there is a need for substantially reducing and/or eliminating jitter from a series of repeating devices.

One conventional device for reducing jitter is a jitter attenuator. FIG. 2 shows a block diagram of a conventional jitter attenuator 20. The jitter attenuator 20 has a data input terminal, a data output terminal, a clock input terminal and a clock output terminal. The attenuator 20 includes a FIFO 22 which receives input data at an input clock data rate. A circuit 24 detects when the FIFO 22 is half-full. A detection signal output from circuit 24 is coupled to a variable oscillator 26 which adjusts the output clock frequency so as to keep the FIFO 22 half full. In effect, the output clock frequency is controlled to be the approximate average of the input clock frequency. As a result, the jitter of the output data signal is attenuated. Because the source signal (e.g., the input clock signal) for deriving the output clock signal has jitter, the output clock signal, although an average of such source signal, also includes jitter. Accordingly, there is a need for alternative methods and apparatus for reducing jitter, so as to better reduce or substantially eliminate jitter.

SUMMARY OF THE INVENTION

According to the invention, the clock signal of a data source or an estimate of such clock signal is used as a clock output signal for an output data stream of a jitter reduction apparatus. The jitter reduction apparatus is a repeating device which receives an input data stream, then with or without processing such data stream, retransmits the data stream using the defined clock signal (e.g., data source clock signal or an estimate of such clock signal).

According to one aspect of the invention, the jitter reduction apparatus includes a receiver, a data recovery circuit, a FIFO and a transmitter. An input data stream is sensed by the receiver and recovered by the data recovery circuit. The recovered data stream is received into the FIFO at an input clock rate determined by the input data stream. The FIFO outputs the data stream to the transmitter using an output clock signal. The transmitter then outputs the data stream from the jitter reduction device onto the communication channel at a restored strength and sharpness. The output clock signal for the FIFO is defined by the original data source clock signal or an estimate of such original clock signal.

According to another aspect of the invention, a plurality of repeating devices (i.e., stations, repeaters) in series are coupled to a jitter reduction apparatus. An entry data stream is received at the first repeating device in the series and retransmitted to the ensuing repeaters, and then to the jitter reduction apparatus. The jitter accumulated during the retransmissions is substantially reduced by the jitter reduction apparatus.

According to an embodiment in which the original data source clock signal is available, such clock signal defines the output clock signal for the jitter reduction apparatus coupled to such series of repeating devices. According to such an embodiment, jitter is substantially eliminated.

According to embodiments in which the original data source clock signal is not available, a clock recovery apparatus is included for estimating the original data source clock signal. Such estimated clock signal provides an alternative source for the output clock of the jitter reduction apparatus. The clock recovery apparatus senses the entry stream input to the first repeating device in the series of repeating devices, then derives a clock signal from such data stream. The derived clock signal is an estimated clock signal which is input to the jitter reduction apparatus. According to such embodiments, jitter is substantially reduced.

According to another aspect of the invention, multiple groups of repeating devices are connected in series. A first group includes a first plurality of repeating devices in series followed by a first jitter reduction apparatus. A data stream enters the group at one repeating device and is retransmitted in series to the other repeating devices, then to the jitter reduction apparatus. A jitter-reduced data stream is output from the first jitter reduction apparatus to a second group following the first group. The second group includes a second plurality of repeating devices in series with a second jitter reduction apparatus. The jitter accumulated during retransmission through the second group is substantially reduced by the second jitter reduction apparatus. Coupled to each jitter reduction apparatus is a respective clock recovery apparatus. A first clock recovery apparatus senses the data input stream input to the first group and defines an output clock signal for the first jitter reduction apparatus. A second clock recovery apparatus senses the data input stream to the second group (e.g., data output from first jitter reduction apparatus) and defines an output clock signal for the second jitter reduction apparatus. Accordingly, jitter accumulated during retransmission along the communication channel is substantially reduced.

According to another aspect of the invention, a token ring network of stations includes a plurality of jitter reduction apparatuses. Coupled to each jitter reduction apparatus is a respective clock recovery circuit. The stations are grouped in series. Each series is coupled to a jitter reduction apparatus. A series receives an entry data stream which is repeated from station to station along the series to produce an exit data stream at the last station of the series. The exit data stream is coupled to the jitter reduction apparatus which substantially reduces jitter accumulation from transmission along the series of stations.

According to another aspect of the invention, the token ring network includes an apparatus for identifying which series of stations includes the network's active monitor at a given time. The network also includes a switching mechanism for selecting the source of an output clock signal used by the jitter reduction apparatus. For a series of stations which does not include the active monitor, the switching mechanism couples an entry data stream recovered clock signal to the jitter reduction apparatus. For a series which does include the active monitor, the switching mechanism couples an exit data stream recovered clock signal to the jitter reduction apparatus.

According to another aspect of the invention, at any given time, the active monitor of the network is located to a given series of stations by comparing address portions of an entry data stream claim token frame to corresponding addresses of an exit data stream claim token frame. A change of the entry data stream addresses to equal the exit data stream addresses signifies that the active monitor has become one of the stations in the series.

The invention may be better understood upon reference to the following description in connection with the accompanying drawings.

DESCRIPTION OF THE PREFERRED EMBODIMENTS

Jitter Reduction Apparatus

Figure 1:
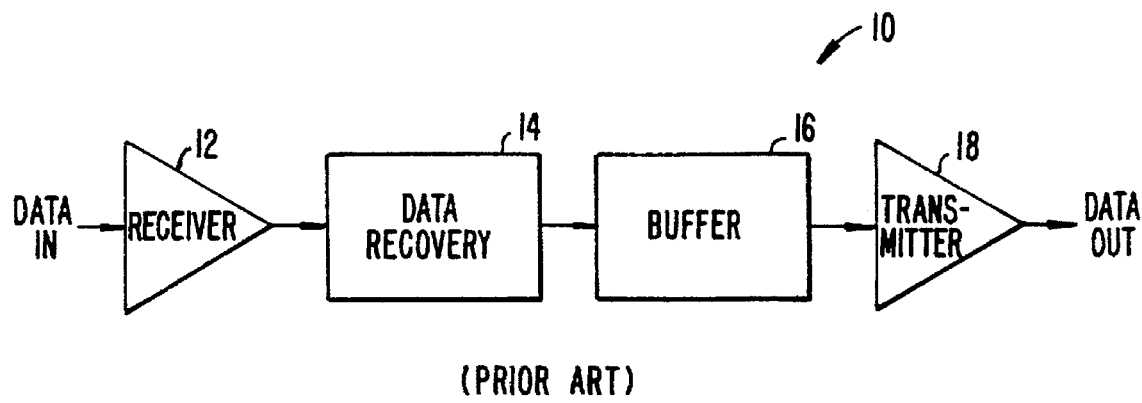
FIG. 1 is a block diagram of a conventional repeater.
Figure 2:
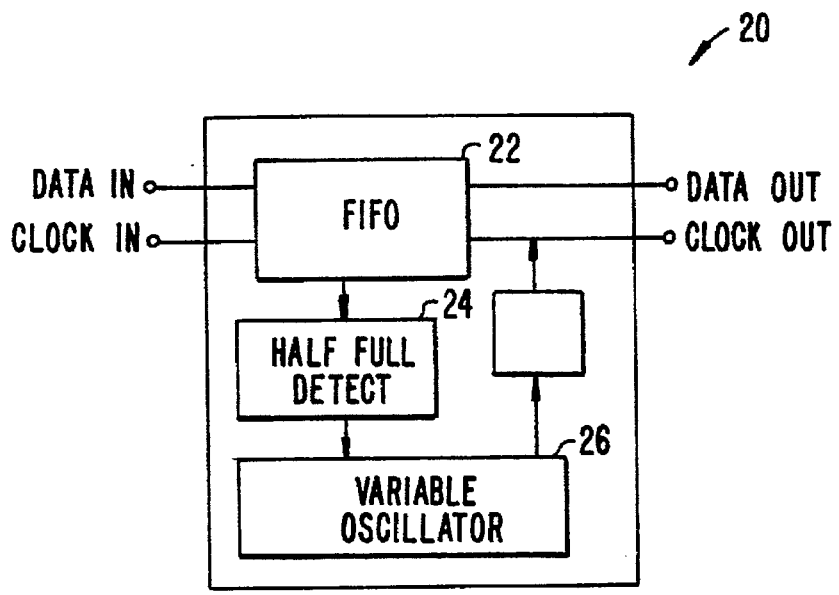
FIG. 2 is a block diagram of a conventional jitter attenuator.
Figure 3:
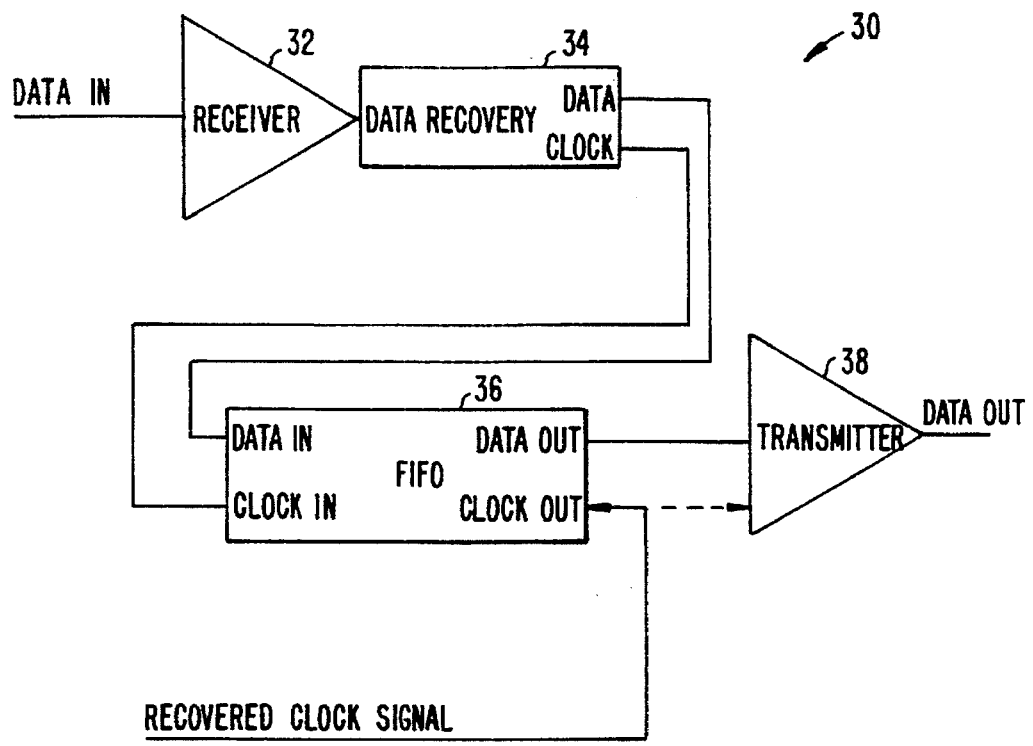
FIG. 3 is a block diagram of a jitter reduction apparatus according to an embodiment of this invention.

FIG. 3 is a block diagram of a jitter reduction apparatus 30 according to a preferred embodiment of the invention. The function of the apparatus 30 is to substantially eliminate or reduce accumulated jitter from communication transmissions along a series of repeating devices. For a local area network embodiment, the communication is referred to as a packet, message or frame. For other embodiments, the communication may be referred to using different terms in accordance with the communication protocol. Typically, however, each communication is formed by a data stream.

The jitter reduction apparatus 30 includes a receiver 32, a data recovery circuit 34, a FIFO 36 and a transmitter 38. A data stream is received at receiver 32, then detected as a pattern of digital bits at data recovery circuit 34. The recovered bits are stored in the FIFO 36 on a bit by bit basis. According to alternative embodiments, however, the data stream may be stored in words of a predetermined length. According to an embodiment in which the apparatus 30 is to be coupled to approximately 8–10 repeating devices in series, the FIFO is approximately 16–20 bits deep.

At system startup, the jitter reduction FIFO 36 is initialized to begin outputting when half full. Thereafter, the FIFO 36 remains approximately half full as the data stream flows continuously. FIFO 36 receives data according to an input clock signal as received from the data recovery circuit 34. FIFO 36 outputs the data to the transmitter 38 at a rate defined by an output clock signal. The FIFO 36 receives a recovered clock signal which defines the output clock signal. The output clock signal in alternative embodiments also may be coupled to the transmitter 38.

The recovered clock signal is derived from either the original data transmission clock or a derived clock signal. For embodiments in which the recovered clock signal is a derived clock signal, a clock recovery apparatus receives a data stream, then derives the clock signal from such data stream. The source of the data stream varies according to the embodiment as described below for the various embodiments. The clock recovery apparatus (FIG. 7) preferably is a "clock recovery chip" manufactured by ATT, part no. T7033. Other clock recovery circuits may be used, however, including a phase-locked loop circuit, a "soft" filter circuit, or an injection-locked oscillator circuit.

To achieve communication between two nodes along a physical communication channel, a data source transmits a data stream over the channel. As the data stream traverses the physical communication channel, the electronic signals forming the data stream attenuate and become distorted. As the data stream is repeated by a repeating device so as to traverse longer distances, the data stream accumulates jitter.

Figure 4:
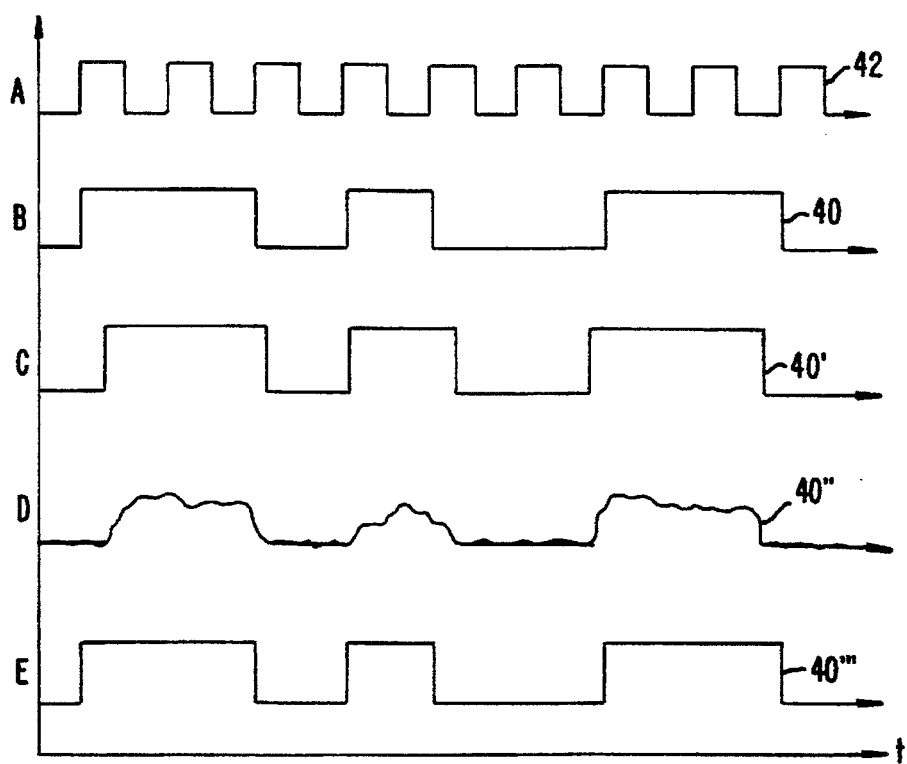
FIG. 4 is a chart of waveforms including an original data source clock signal and several data streams at points along a physical communication channel.

FIG. 4 shows timing diagrams of an original data transmission clock signal 42 and a corresponding data stream 40 at various points along a communication channel. Curve A shows the clock signal 42 of the original data source transmission. Curve B shows a portion of the data stream 40 as originally transmitted from the data source. Curve C shows the same portion 40' after several retransmissions, as output from a repeating device. As shown, the output data stream 40' has a restored amplitude and sharpness, but has accumulated jitter. The jitter is seen as the phase instability of the component data pulses forming the communication. Note that the phase instability is exaggerated for purposes of illustration and description. Curve D shows the same portion 40" as received at a jitter reduction apparatus 30. In comparison to curve C, the data stream 40" has attenuated and become distorted (exaggerated for purposes of illustration and description). Data stream 40" also exhibits the accumulated jitter from multiple retransmissions. Curve E shows the data stream 40''' as output from the jitter reduction apparatus 30. Note that the phase instability of the output data stream 40''' is substantially reduced or eliminated.

Repeating Device Configuration—Data Source Clock Available

Figure 5:
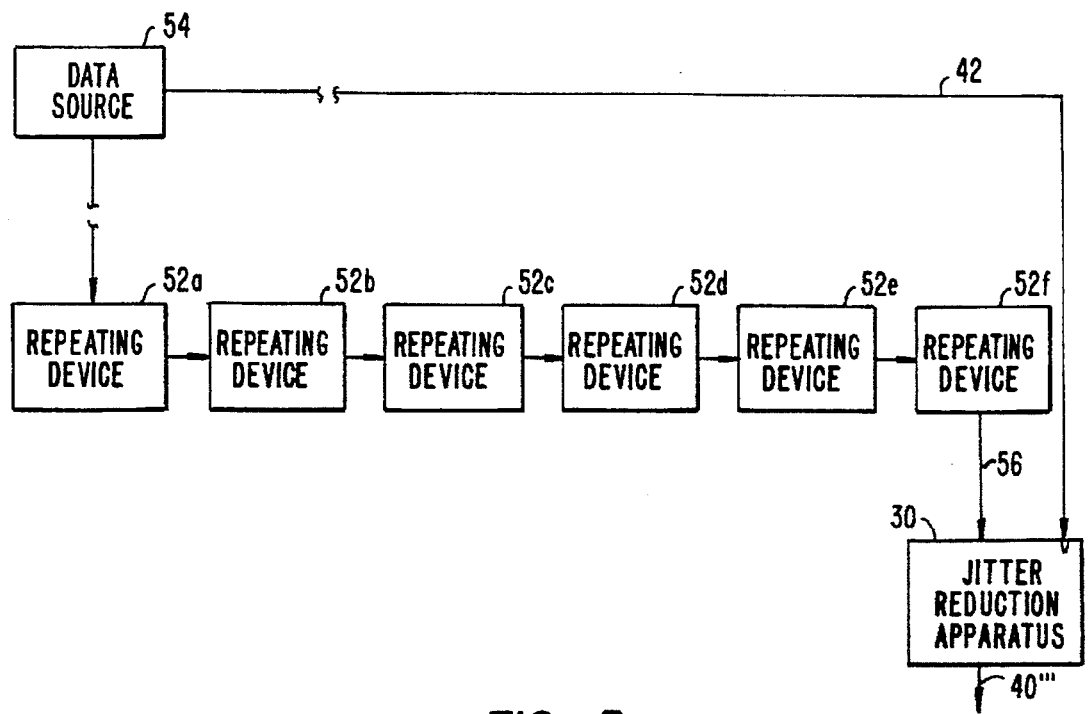
FIG. 5 is a block diagram of a series of repeating devices coupled to a jitter reduction apparatus of FIG. 3 for an embodiment in which the data source clock signal is available.

FIG. 5 depicts a configuration of repeating devices 52 coupled in series to transmit a data stream along a physical communication channel. The data source 54 transmits an original data stream 40 directly or indirectly to the first repeating device 52a of the series. A data stream entering a series of repeating devices is referred to herein as an entry data stream. The entry data stream is buffered at repeating device 52a, then retransmitted to the next repeating device 52b. The data stream continues to be transmitted from repeating device 52 to repeating device 52 until output as exit data stream 40' at device 52f. The exit data stream 40' travels over the physical communication channel 56 to jitter reduction apparatus 30. The data stream 40' degrades by transmission over the channel 56 so that it is received in degraded form as illustrated by data stream 40". The data stream 40" is received by the jitter reduction apparatus 30 into FIFO 36. According to the embodiment of FIG. 5, the original transmission clock signal from the data source is available and thus recovered by direct coupling to the jitter reduction apparatus 30. Such clock signal is used as the clock for outputting the restored data stream 40''' as a jitter-reduced data stream.

Figures 6, 6A:
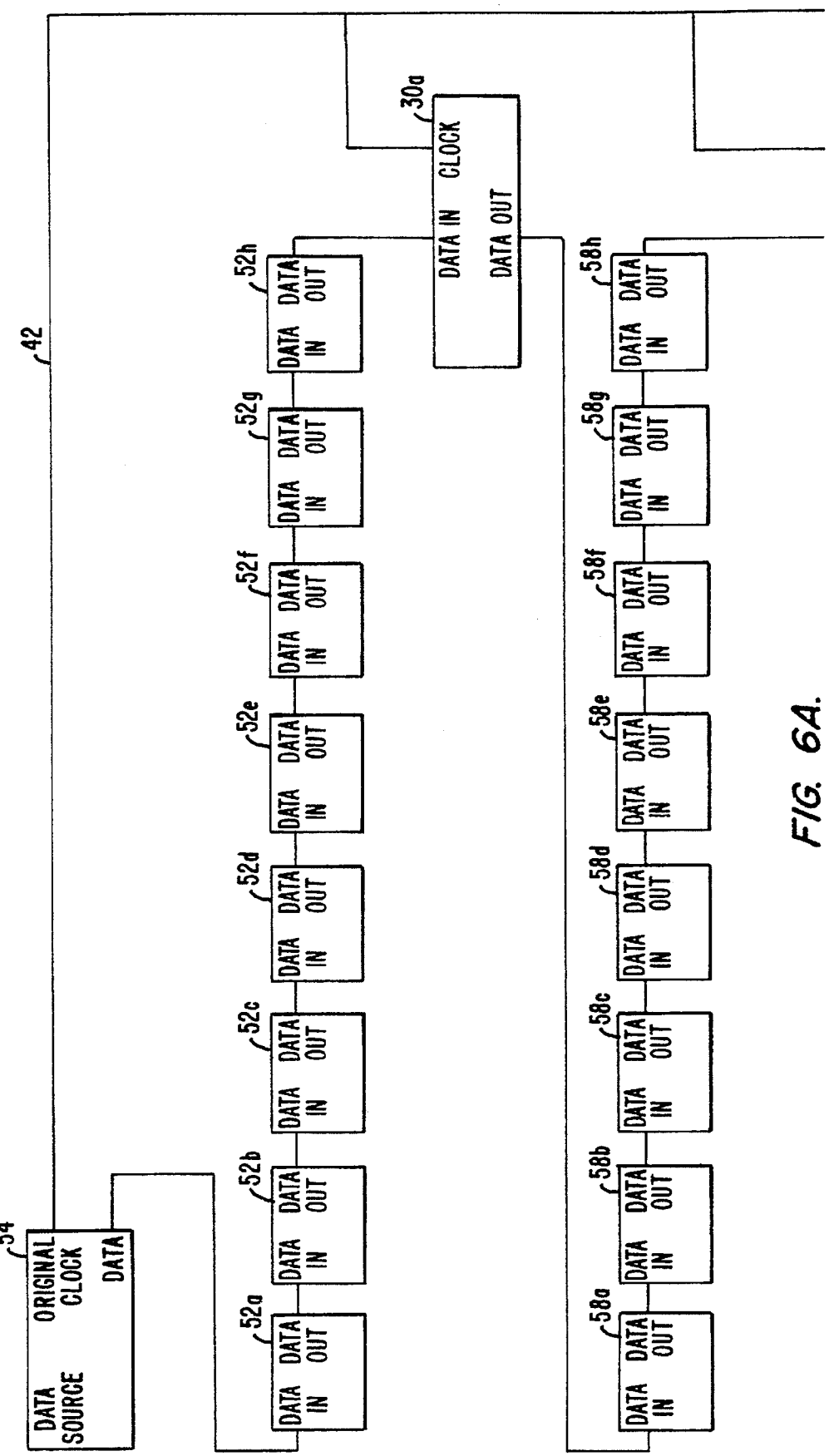
FIG. 6 is a block diagram of multiple groups of repeating devices, each group coupled to a jitter reduction apparatus of FIG. 3 for an embodiment in which the data source clock signal is available.
Figure 6B:
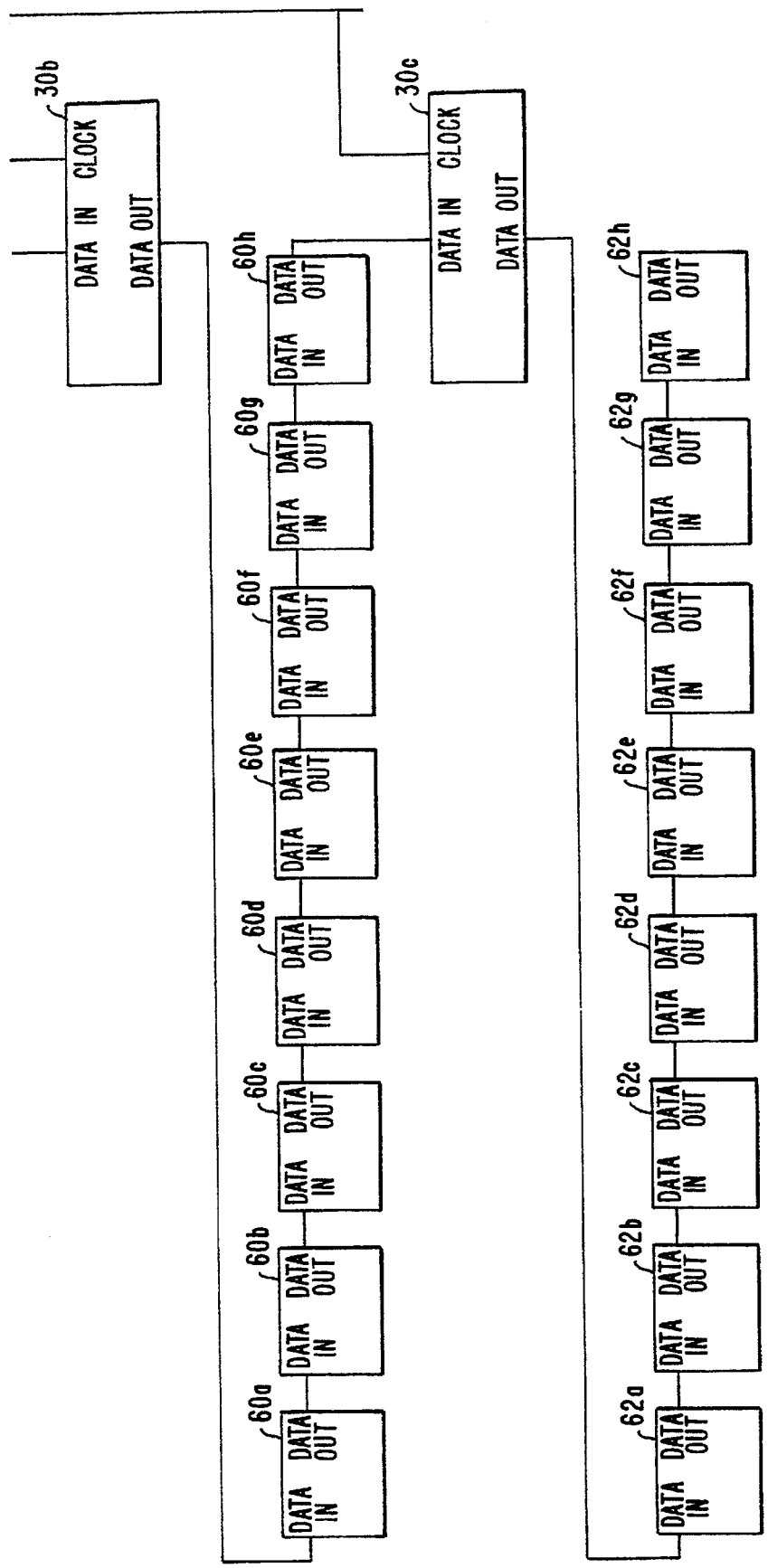

FIG. 6 shows multiple groups of repeating devices 52, 58, 60, 62 and jitter reduction apparatuses 30. The first group of repeating devices 52 receive an entry data stream directly from a data source 54. The data stream is transmitted and retransmitted along the series of repeating devices 52 until being output as an exit data stream at repeating device 52h. A jitter reduction apparatus 30a receives the exit data stream and stores the data in FIFO 36 (FIG. 3). A restored data stream 40''' is retransmitted from the jitter reduction apparatus 30a using the original data source clock signal 42. The restored data stream is output to the first repeating device 58a in the next series of repeating devices. The data stream output from the jitter reduction apparatus 30a is a jitter-reduced data stream.

The jitter-reduced data stream enters the next series of repeating devices 58 as an entry data stream. As the data stream traverses the repeating devices 58, the data stream again accumulates jitter. The jitter reduction apparatus 30b receives an exit data stream from repeating device 58h and stores the data. The data stream then is clocked out of apparatus 30b using the original data source clock signal 42 to generate a jitter reduced data stream 40'''. The forwarding of the data stream continues through repeating devices 60, 62. According to various embodiments, the data stream transmission continues until a destination station is reached, all nodes on the channel are reached, or in a ring network, until the data stream is removed from the network by the data source 54.

By recovering the original data transmission clock for use as the output clock signal of the jitter reduction apparatuses, jitter accumulation along the communication channel is substantially eliminated.

Repeating Device Configuration—Data Source Clock Unavailable

Figure 7:
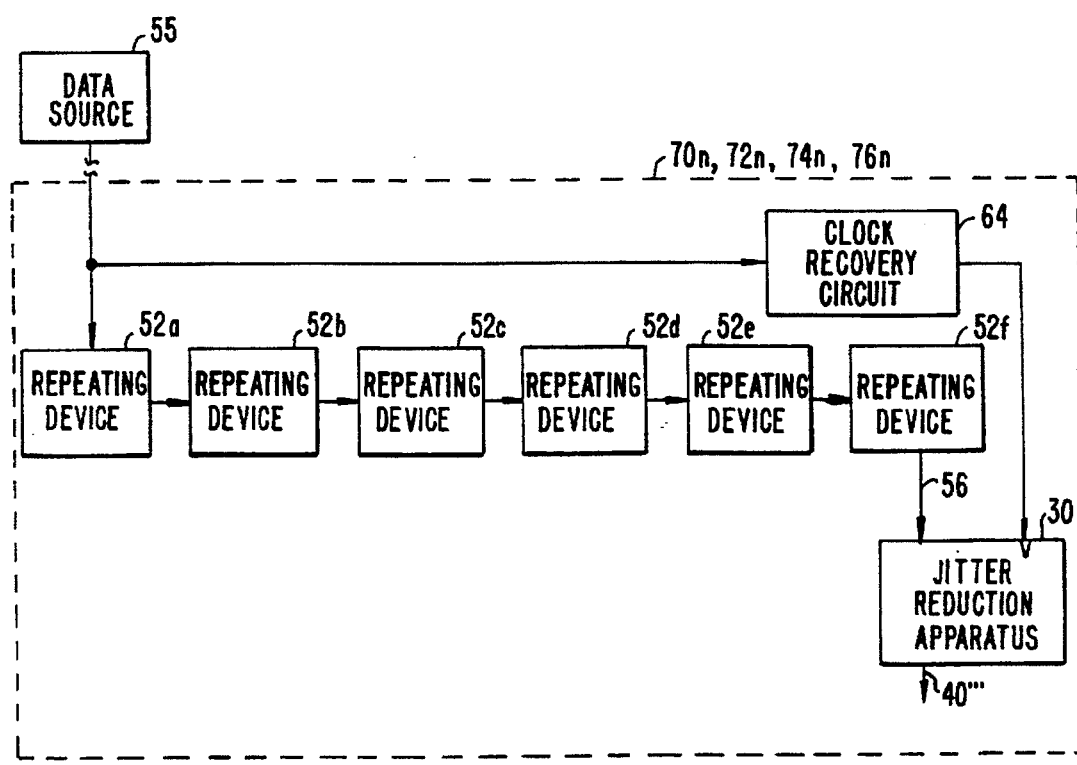
FIG. 7 is a block diagram of a series of repeating devices coupled to a jitter reduction apparatus of FIG. 3 for an embodiment in which the data source clock signal is not available.

FIG. 7 depicts another configuration of repeating devices 52 coupled in series to transmit a data stream along a physical communication channel. A data source 55 transmits an original data stream 40 directly or indirectly to the first repeating device 52a of the series. The data stream as received by the first repeating device 52a in the series again is referred to herein as an entry data stream. The entry data stream is buffered at repeating device 52a, then retransmitted to the next repeating device 52b. The data stream continues to be transmitted from repeating device 52 to repeating device 52 and then is output as exit data stream 40' at device 52f. The exit data stream 40' travels over the physical communication channel 56 to the jitter reduction apparatus 30. The exit data stream 40" is received by the jitter reduction apparatus 30 and stored at FIFO 36 (FIG. 3).

The embodiment of FIG. 7 differs from the embodiment of FIG. 5 in that the clock signal of the original data source transmission is not available. Instead, an output clock signal for the jitter reduction apparatus 30 is derived from the entry data stream which is input to the first repeating device 52a of the series. Such derived clock signal serves as an estimate of the original data transmission clock 42. A clock recovery apparatus 64 receives the entry data stream as input to the first repeating device 52a to derive the output clock signal.

The apparatus 64 preferably is a "clock recovery chip" manufactured by ATT, part no. T7033, although other clock recovery circuits may be used. The recovered clock signal is used as the clock for outputting the restored data stream 40''' from the jitter reduction apparatus 30 as a jitter-reduced data stream.

Figure 8B:
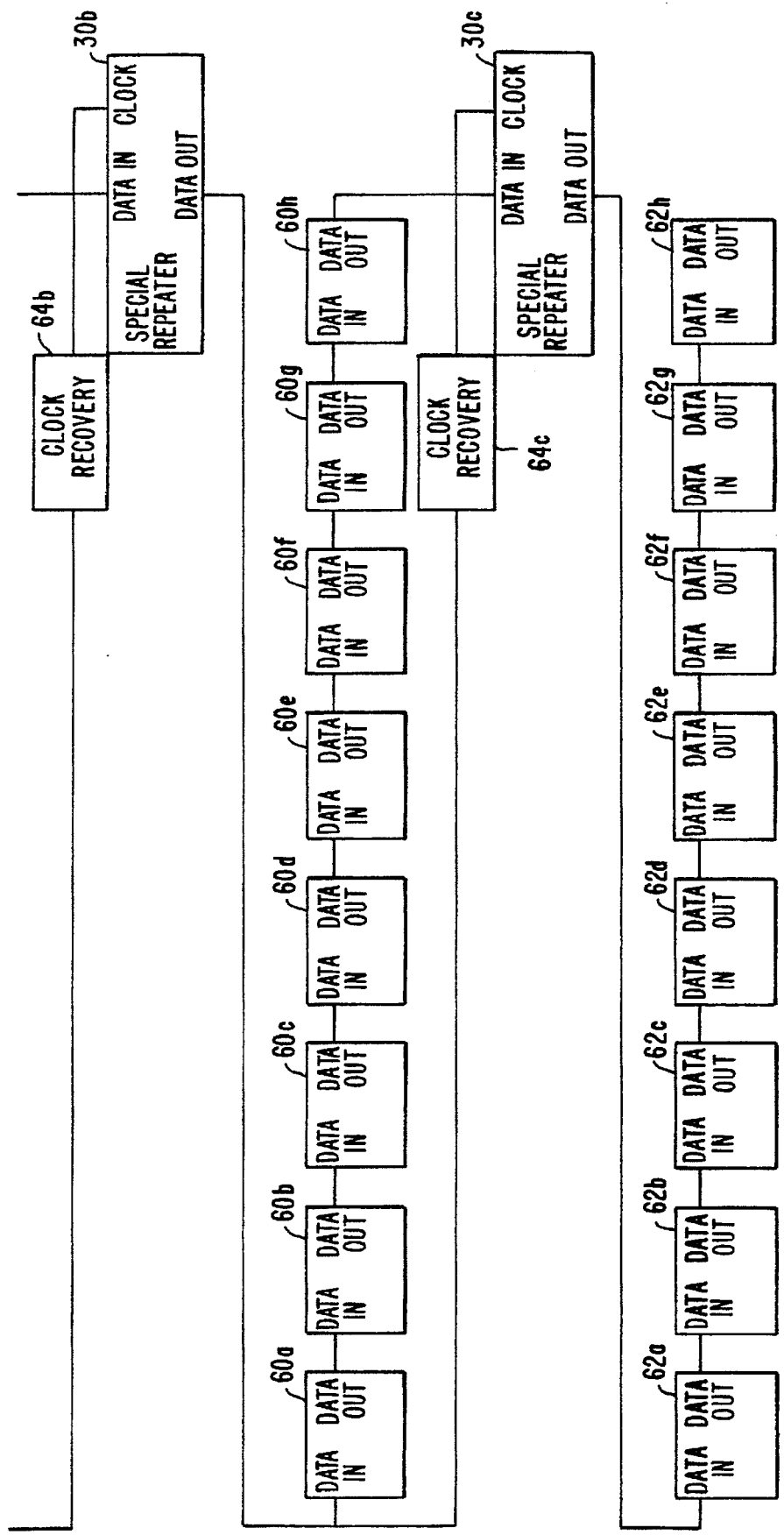
FIG. 8 is a block diagram of multiple groups of repeating devices, each group coupled to a jitter reduction apparatus of FIG. 3 for an embodiment in which the data source clock signal is not available.

FIG. 8 shows multiple groups of repeating devices 52, 58, 60, 62 and jitter reduction apparatuses 30. The first group of repeating devices 52 receives an entry data stream directly from the data source 55. The data stream is transmitted and retransmitted along the series of repeating devices 52 until output from repeating device 52h as an exit data stream. Jitter reduction apparatus 30a receives the exit data stream and stores the data in FIFO 36. The data stream then is retransmitted from the jitter reduction apparatus 30a using a clock signal derived from the entry data stream. A clock recovery circuit 64a, as previously described, receives the entry data stream and generates the clock signal from such data stream. The derived clock signal serves as an estimate of the original data transmission clock.

The jitter reduction apparatus 30a outputs the jitter-reduced data stream to the first repeating device 58a in the next series of repeating devices 58. The data stream enters the series 58 as an entry data stream. As the data stream traverses the repeating devices 58, the data stream again accumulates jitter. In turn, the next jitter reduction device 30b receives the data stream as an exit data stream and stores the data. Another clock recovery circuit 64b receives the entry data stream as received by the first repeating device 58a. The clock recovery circuit 64b derives a clock signal from the entry data stream. The derived clock signal is input to the jitter reduction apparatus 30b for clocking the data stream out of jitter reduction apparatus 30b.

The forwarding of the data stream continues through repeating devices 60, 62. According to various embodiments, the data stream transmission continues until a destination station is reached, all nodes on the channel are reached, or in a ring network, until the data stream is removed from the network by the data source 54.

By recovering a clock signal from the entry data stream of a series of repeating devices for use as the jitter reduction apparatus output clock signal, jitter accumulated along the series of repeating devices is substantially reduced.

Hierarchy Configuration—Data Source Clock Unavailable

Figure 9B:
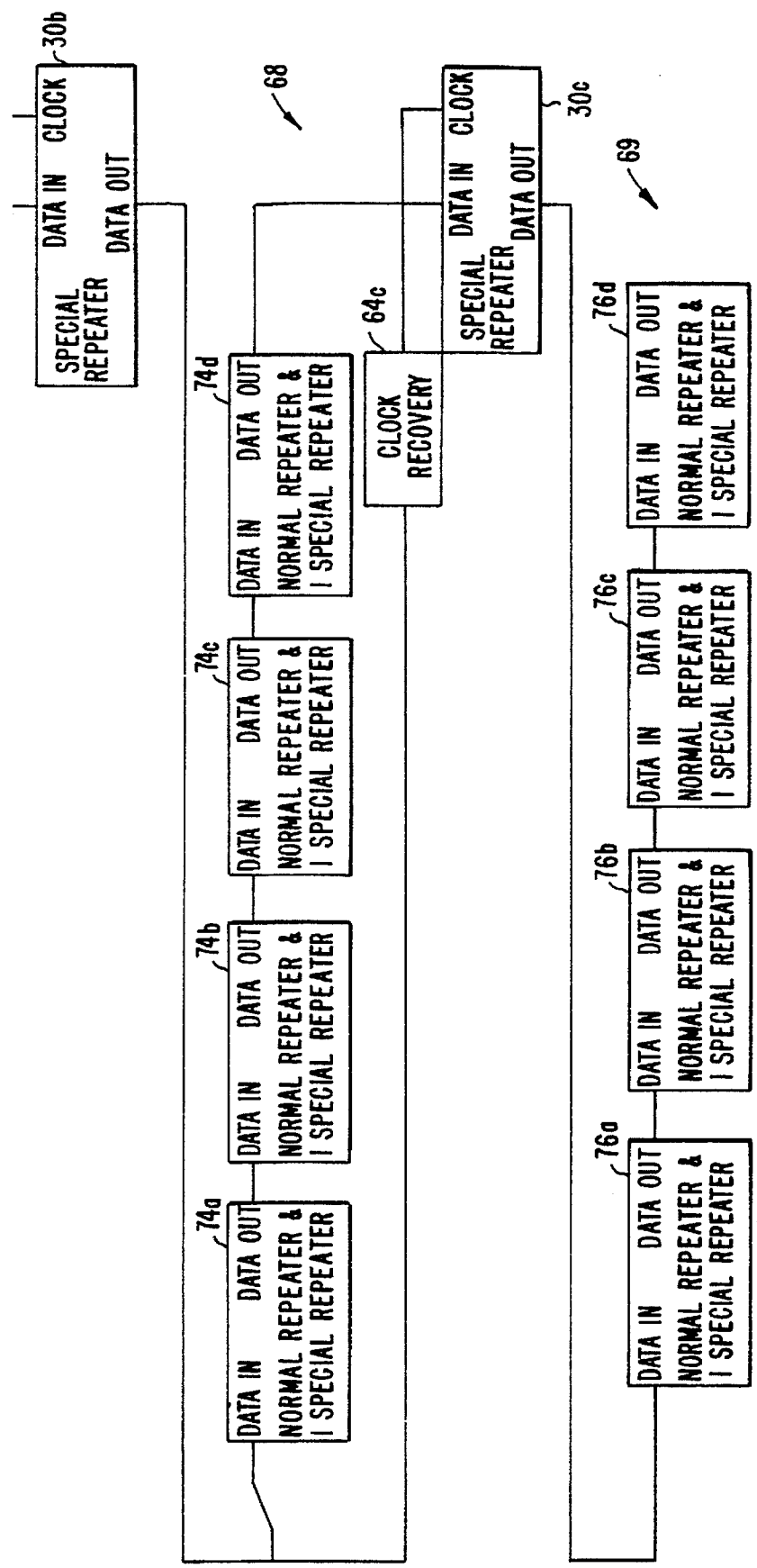
FIG. 9 is a block diagram of a hierarchy of repeating device groups in which the original data source clock is not available.

FIG. 9 shows a hierarchy configuration of repeating devices and jitter reduction apparatuses. The hierarchy includes multiple tiers 66, 67, 68 and 69. Each tier is formed by multiple groups of repeating devices coupled in series. A jitter reduction apparatus 30' is coupled in series to each tier 66, 67, and 68. A respective clock recovery circuit 64 is coupled to each jitter reduction apparatus 30. Tier 66 is formed by multiple groups 70a–70d. Tier 67 is formed by multiple groups 72a–72d. Tier 68 is formed by multiple groups 74a–74d. Tier 69 is formed by multiple groups 76a–76d. FIG. 7 shows the structure of a group 70n, 72n, 74n and 76n.

For a given tier 66, an entry data stream is received at the first group 70a and at the associated clock recovery circuit 64 (FIG.7). Within group 70a (see FIG. 7), the entry data stream is received at the first repeating device 52a and the clock recovery circuit 64. The data stream is forwarded through the series of repeating devices 52 until output to the jitter reduction apparatus 30 as an exit data stream. The accumulated jitter from the forwarding is substantially reduced by clocking the data stream out of jitter reduction apparatus 30 using the clock derived by clock recovery circuit 64. The data stream then enters the next group 70b in the tier 66 as another entry data stream. The forwarding continues from repeating device to repeating device and group to group until reaching the jitter reduction apparatus 30a' at the end of the tier 66.

The data stream is received by jitter reduction apparatus 30a' as an exit data stream from the group 70d. A clock for the jitter reduction apparatus 30a' is derived by clock recovery circuit 64a' from the entry data stream of the tier 66 (e.g., data stream as entering repeating device 52a of group 70a). The data stream then is forwarded to the first group 72a of the next tier 68. The data stream is forwarded in turn to each repeating device of each group of each tier.

In summary, for each group the jitter reduction apparatus 30 receives a clock derived from the entry data stream to the group. For each tier the jitter reduction apparatus 30' receives a clock derived from the entry data stream to the tier. By referencing back to the entry data stream of the group and the entry data stream of a tier, a hierarchy approach to jitter reduction is implemented. Accordingly, jitter accumulation along the physical communication channel is substantially reduced.

Token Ring Network Embodiment

Figure 10:
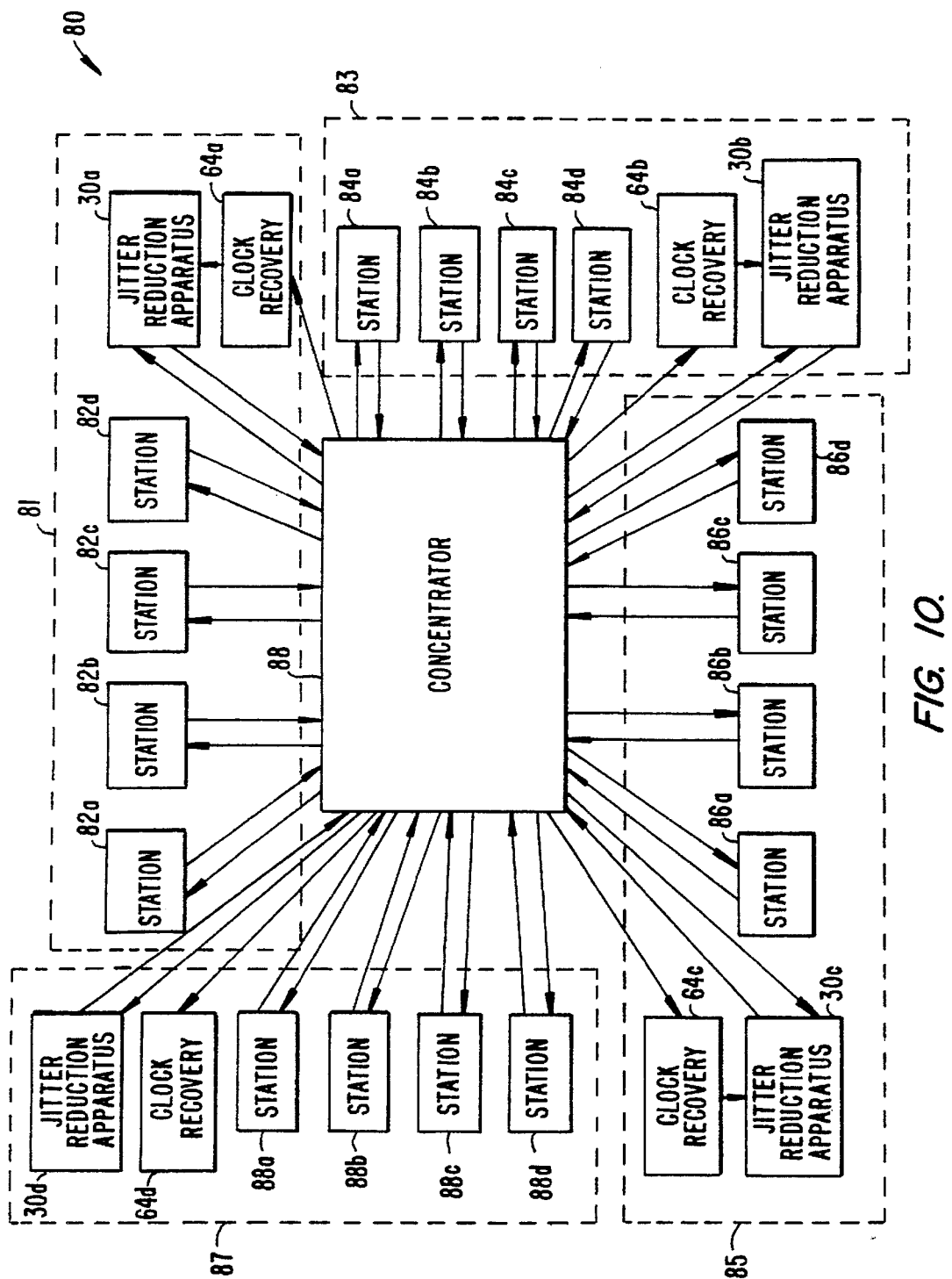
FIG. 10 is a block diagram of a token ring network according to an embodiment of this invention.

FIG. 10 depicts a token ring local area network 80 according to an embodiment of this invention. The token ring network 80 includes a series of stations 82 coupled to a jitter reduction apparatus 30a, a series of stations 84 coupled to a jitter reduction apparatus 30b, a series of stations 86 coupled to a jitter reduction apparatus 30c, and a series of stations 88 coupled to a jitter reduction apparatus 30d. The network is configured as a star with communications routed through a concentrator 88. Logically, however, the network 80 forms a token ring network in which communications (i.e., frames) are passed from one station to the next in physical sequence along the ring. Each station transmits the communication to the next station, acting as a repeating device.

Although, the jitter reduction apparatuses 30 and clock recovery circuits 64 are shown separate from the concentrator 88, the apparatuses 30 and circuits 64 may be packaged as part of the concentrator. In addition, although a single concentrator is shown, a plurality of concentrators (i.e., one per group of stations) may be used.

The stations 82, 84, 86 and 88, along with the jitter reduction apparatuses and clock recovery circuits are organized into groups 81, 83, 85, 87, respectively. Each group includes a series of stations coupled to a jitter reduction apparatus and a clock recovery circuit.

The right to transmit data in a token ring network 80 is controlled by a token frame, which is passed from one station to the next along the ring. A token frame indicating permission to transmit is referred to as a free token. When a station receives a free token, the station may transmit data units until a predetermined time limit is reached. Such station modifies the frame from a free token to a busy token, and includes the busy token in the communication frame. When a destination station receives the communication, the data is read and the communication repeated. When the communication returns to the original transmitting station which created the communication, the station removes the data and forwards a free token.

In normal operation, one station on the network functions as an active monitor, while other stations function as passive monitors. The active monitor continuously monitors the network so as to perform fault management. The passive monitors overlook the status of the active monitor. A passive monitor may take over as active monitor when the prior active monitor is unable to function. The active monitor creates the token frame which is routed around the network and subsequently modified or regenerated for forming a data frame.

Frames are transmitted from station to station in physical sequence, then to a jitter reduction apparatus 30. The apparatus 30 reduces jitter accumulation, then forwards the communication to the next series of stations. A communication entering a series of stations is referred to as an entry data stream 40. A communication which exits a series is referred to as an exit data stream 40'. The exit stream is received by a jitter reduction apparatus 30 as a degraded exit data stream 40". The jitter reduction apparatus reduces jitter accumulation, then forwards the data stream to the next series as a jitter reduced data stream (e.g., an entry data stream for the next series).

One characteristic of the active monitor station is that frames are generated or forwarded with a clock which is the reference for the network. Thus, the frame is newly generated (even if the contents are being forwarded). Such newly generated frame thus has phase stability and a given clock rate.

If an original transmission clock signal from the active monitor is available along the network, then the jitter reduction apparatuses 30 will recover such clock directly as described with regard to FIGS. 5 and 6. With regard to FIGS. 5 and 6, the active monitor is the data source 54, while the repeating devices 52 are stations which may or may not add a message to the frame as it is forwarded around the ring.

Typically, the clock output of the active monitor, however, is not available. Accordingly, an output clock signal is derived from the data stream as described with regard to FIG. 7. With regard to such FIG. 7, the active monitor is the data source 55, while the repeating devices 52 are stations which may or may not add a message to the frame (i.e., token) as it is forwarded around the ring. The group 70 depicted in FIG. 7 corresponds to the logical configuration of a group 81 ... 87 in network 80 which does not include the active monitor. Accordingly, the clock recovery circuit 64a passes an entry data stream recovered clock signal to the jitter reduction apparatus 30a.

Figure 11:
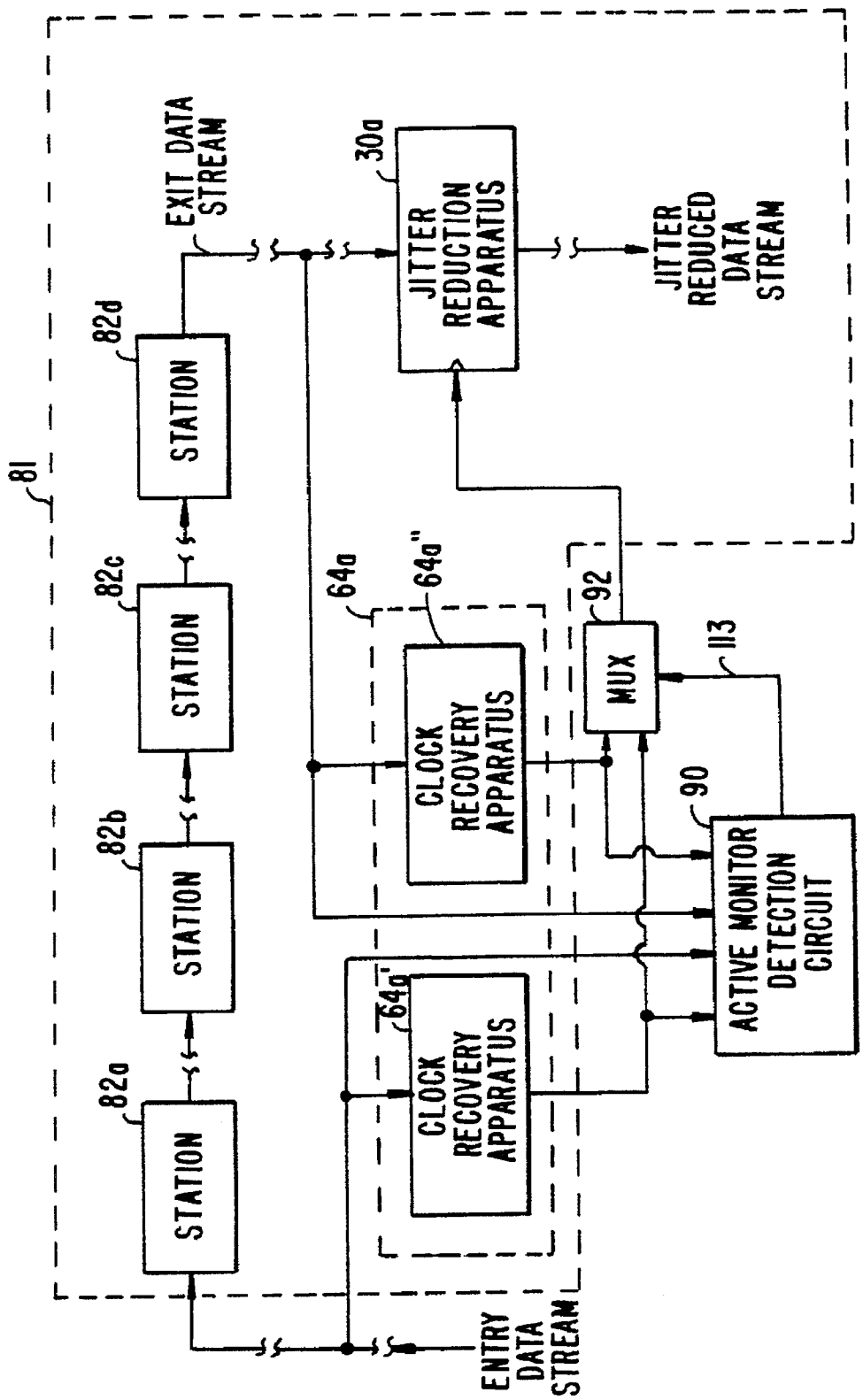
FIG. 11 is a block diagram of a series of stations in the token ring network of FIG. 10 coupled to a jitter reduction apparatus and clock recovery circuit according to an embodiment of this invention.

FIG. 11 shows group 81, including station 82a–d, jitter reduction apparatus 30a and clock recovery circuit 64a. Communications from a station 82 to a station 82 are shown by a broken line to indicate that the communication is routed through the concentrator 88, but that logically the communication flows to the next station. Clock recovery circuit 64a is shown to include a clock recovery circuit 64a' which recovers a clock signal from the entry data stream, and a clock recovery circuit 64a" which recovers a clock signal from the exit data stream.

FIG. 11. also depicts active monitor detection circuitry 90 and a MUX 92. Circuitry 90 serves to identify whether the stations in group 81 include the active monitor. MUX 92 serves to select either one of the entry data stream recovered clock signal or the exit data stream recovered clock signal as the output clock for the jitter reduction apparatus 30a.

For a group 81 which does not include the active monitor, the active monitor detection circuitry 90 sets the MUX 92 to select the entry data stream recovered clock signal. For a group 81 which does include the active monitor, the active monitor detection circuitry 90 sets the MUX 92 to select the exit data stream recovered clock signal. The exit data stream provides a better source in such case because the series includes the active monitor which generates reference clocking for the communications.

According to a preferred embodiment, the active monitor detection circuitry 90 and MUX 92 are located in the concentrator 88 for each group 81, 83, 85, 87.

Active Monitor Detection For Token Ring

For a station 82c to become an active monitor, claim token frames are generated by such station 82c, for example and forwarded around the network. Such claim token frames include a source address ("SA") and an upstream neighbor's address ("UNA"). If a claim token frame returns to the generating station 82c with the same SA and the same UNA, then the station 82c becomes the active monitor. If a station having a higher station address (i.e., station 84b), however, generates a claim token frame which is received by the original station 82c, then station 82c goes into standby mode. Upon completion of the active monitor allocation, the active monitor generates a free token frame which is transmitted along the network. In brief, the allocation of an active monitor within a group is indicated by the return of the claim token frame to the station originating the claim token frame.

To test for an active monitor in, for example, group 81, the active monitor detection circuitry 90 scans the entry data stream going into station 82a and the exit data stream coming from station 82d. Because the data streams correspond to token ring protocols, the data streams include frames. A frame includes an access control field, frame control field, information field and source address field, along with other fields. The access control field indicates whether the data stream is a token frame or a data frame. The frame control field indicates whether the frame is for a media access control ("MAC") operation. The information field includes a vector identifier for identifying whether the MAC frame is a claim token frame. The source address indicates the station address of the station originating the claim token frame.

Allocation of an active monitor to a station 82 is characterized by an entry claim token frame source address which changes to match the previous exit claim token frame source address. The active monitor detection circuitry 90 stores the SA of exit claim token frames. (In addition, the circuitry 90 also may store and check the UNA to distinguish between stations having duplicate addresses). Circuitry 90 also detects the SA (and UNA) of entry claim token frames. If the entry claim token frame information changes to equal the already stored exit claim token frame information, then the active monitor detection circuit 90 determines that the active monitor is in the group corresponding to the entry data stream and exit data stream. Accordingly, the circuitry 90 sets the select line of MUX 92 to select the exit data stream recovered clock signal.

If, however, the active monitor detection circuit 90 determines that the exit claim token frame SA (and UNA) changed to equal the entry claim token frame SA (and UNA), then the select line of MUX 92 is set to select the entry data stream recovered clock signal. If the entry claim token frame SA (and UNA) equal the exit claim token frame SA (and UNA) and neither set of addresses changed, then the select line of MUX 92 is not altered.

Allocation of an active monitor occurs while claim token frames are being generated and are circulating around the ring. The active monitor detection circuit 90 continuously monitors the entry data stream and exit data stream to identify such claim token frames. Accordingly, to alter the select line of MUX 92, a claim token frame first is identified. During the continuous detection of claim token frames, the circuitry 90 performs the comparisons as described above for setting the select line of MUX 92 each time an entry claim token frame or exit claim token frame is identified. Once claim token frames are no longer detected, then the circuitry 90 no longer adjusts the select line. The select line thus is locked in until the active monitor allocation process re-commences.

Active Monitor Detection Circuit

Figure 12:
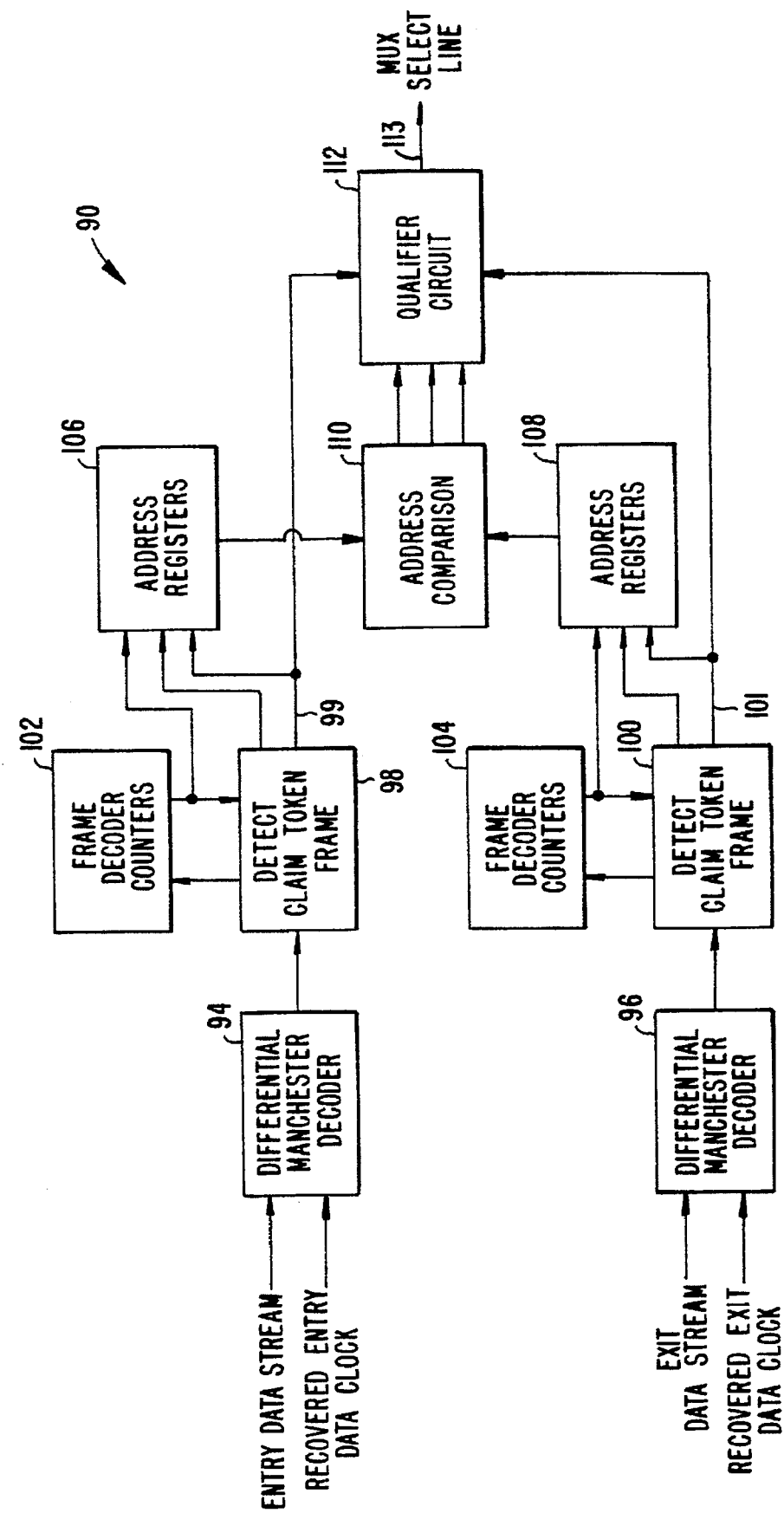
FIG. 12 is a block diagram of the active monitor detection circuit.

A block diagram of the active monitor detection circuit 90 is shown in FIG. 12. The function of the active monitor detection circuit 90 is to determine whether the active monitor of a network 80 is in a corresponding group 81. The circuit 90 defines the select line for the MUX 92 according to whether the active monitor is in the group or not.

The entry data stream and exit data stream for a given group 81 are input to the active monitor detection circuit 90 at respective differential manchester decoders 94, 96 (FIG. 12). Such entry data stream and exit data stream also are received into respective clock recovery circuits 64a' and 64a" (FIG. 11). The recovered clocks from the respective data streams then are input to the differential manchester decoders 94, 96.

Differential manchester decoder 94 generates NRZ data in response to the entry data stream using the recovered clock signal for the entry data stream. Such NRZ data is input to the claim token frame detection circuit 98. Similarly, differential manchester decoder 96 generates NRZ data in response to the exit data stream using the recovered clock signal for the exit data stream. Such exit data stream NRZ data is input to the claim token frame detection circuit 100.

Each detection circuit 98, 100 generates a respective detect signal 99, 101. A detect signal is active when a claim token frame is detected. Detection is accomplished by examining the NRZ data to identify distinct frames. The incoming NRZ data stream is scanned to identify a frame delimiter bit pattern, and thus, the start of a frame. For a frame, the frame type bits of the frame control field are tested to determine whether the frame is a MAC frame. In addition, the vector identifier bits in the information field are tested to determine whether the frame is either one of a claim token frame or a beacon frame (i.e., a frame used as part of fault management).

The detection circuit 98, 100 also verifies whether the frame is a valid frame. A valid frame is determined by detecting: an end of frame delimiter; an integral number of octets in the frame; no coding violations between the delimiters in the frame; an error bit equal to 0; and a good frame check sequence. A respective detection circuit 98, 100 generates an active detect signal 99, 101 when a valid frame is identified and the frame is a claim token frame.

The detection circuits 98, 100 use respective frame decoder counters 102, 104. A respective counter 102, 104 is initialized at the beginning of a frame. Thereafter, the counter 102, 104 generates the decode enable signals and synchronization signals for parsing the NRZ data so that the corresponding detection circuit 98, 102 can test the appropriate NRZ data for the appropriate bit patterns. The counter 102, 104 also provides shift enable signals for the corresponding source address registers 106, 108.

The detection circuits 98, 100 output a respective detect signal 99, 101 in either an active state (e.g., claim token frame present) or an inactive state (e.g., invalid frame or claim token not present). The detection circuits 98, 100 also output the bits parsed from a claim token frame which correspond to the source address ("SA") and upstream neighbor's address ("UNA").

The address information is output to the corresponding address registers 106, 108. Address registers 106 store the SA (and UNA) of a frame when the detect signal 99 is active and the corresponding shift enable signal from the corresponding counter 102 is active. Similarly, source registers 108 store the SA (and UNA) of a frame when the detect signal 101 is active and the corresponding shift enable signal from the corresponding counter 104 is active. At initialization, during certain error conditions and when beacon frames are detected, the source registers 106, 108 are cleared.

The latest SA (and UNA) addresses stored in the source address registers 106 are compared to the latest SA (and UNA) addresses stored in the address registers 108 by comparison circuit 110. The result of the comparison is an address equivalence signal which is output to a qualifier circuit 112.

Whenever one of the detect signals 99, 101 becomes active, the qualifier circuit 112 compares the address equivalence signal to the previous address equivalence signal to determine whether there has been a change in condition. If there has been a change, then the qualifier circuit determines whether the received claim token frame which triggered the comparison to occur resulted from an entry data stream (e.g., detect signal 99 is active) or an exit data stream (e.g., detect signal 101 is active).

When enabled and while the address equivalence signal signifies that the appropriate entry and exit data stream addresses do not match, the qualifier circuit generates an output signal 113 for selecting the exit data frame clock signal. In such case the exit data stream is used as the best estimate until an active monitor location determination is made.

When the address equivalence signal signifies that the appropriate entry and exit data stream addresses do match, and that the change resulted from an incoming entry data stream claim token frame, then the qualifier circuit 112 generates an output signal 113 for selecting the exit data stream clock signal (e.g., active monitor in group 81). If, instead, the change resulted from an incoming exit data stream claim token frame, then the qualifier circuit 112 generates an output signal 113 for selecting the entry data stream clock signal (e.g., active monitor not in group 81).

When the address equivalence signal signifies that the appropriate entry and exit data stream addresses do match, and no transition has occurred, then the output signal 113 is not altered. Such conditions may occur after the active monitor has been identified to be in the group or not in the group, but before the circulating of claim token frames has ceased. Accordingly, the last state of the output signal 113 is not altered.

The qualifier circuit 112 includes in one embodiment a flip-flop and combinational logic responsive to the transition in the equivalence signal during a claim token frame detection from either detector 98, 100.

The output signal 113 is input to the MUX 92 for selecting either the entry data stream recovered clock signal or the exit data stream recovered clock signal as the input to the jitter reduction apparatus 30a.

CONCLUSION

According to the embodiment of FIGS. 5–6, each jitter reduction apparatus recovers a clock signal by direct coupling to the data source clock signal 42. According to the embodiments of FIGS. 7–11, a jitter reduction apparatus recovers a clock signal using a clock recovery circuit. The clock recovery circuit derives a clock signal from the entry data stream which is input to the first repeating device in a series of repeating devices (except for a series having an active monitor). Such derived clock signal serves as an estimate of the data source clock signal. By clocking the data stream out of the jitter reduction apparatus using a recovered clock signal (e.g., original or derived clock signal), jitter is substantially eliminated or reduced.

Although a preferred embodiment of the invention has been illustrated and described, various alternatives, modifications and equivalents may be used. For example, although a series of six repeating devices and a series of eight repeating devices are illustrated, the number may vary according to the embodiment. A limit on the number to be coupled in series is determined by the amount of jitter accumulated during the retransmissions and the jitter tolerances of the respective repeating devices. The amount of jitter accumulated depends upon the type of communication channel (i.e., twisted-wire-pair, coaxial, fiberoptic), the type of transmission (i.e., broadband, baseband) and the noise susceptibility of each repeating device 52, 58, 60, 62.

Therefore, the foregoing description should not be taken as limiting the scope of the inventions which are defined by the appended claims.

What is claimed is:

1. A method for reducing jitter in a data stream transmission along a physical communication channel, the data stream accumulating jitter during retransmission along a series of repeating devices, the data stream entering the series of repeating devices as an entry data stream, the data stream exiting from the series of repeating devices as an exit data stream, the method comprising the steps of:

receiving the exit data stream from the series of repeating devices;

storing said exit data stream;

recovering a clock signal of the entry data stream; and outputting the exit data stream as a jitter-reduced data stream at a timing defined by the recovered clock signal.

2. The method of claim 1 in which the step of recovering comprises the step of receiving an original data transmission clock signal.

3. The method of claim 1 in which the step of recovering comprises the step of deriving a clock signal from the entry data stream.

4. The method of claim 1 in which a repeating device modifies the data stream contents.

5. An apparatus for reducing jitter in a data stream transmission along a physical communication channel, the data stream accumulating jitter during retransmission along a series of repeating devices, the data stream entering the series of repeating devices as an entry data stream, the data stream exiting from the series of repeating devices as an exit data stream, the apparatus comprising:

means for receiving the exit data stream from the series of repeating devices;

means for storing said exit data stream;

means for recovering a clock signal of the entry data stream; and means for outputting the exit data stream as a jitter-reduced data stream at a timing rate defined by the recovered clock signal.

6. The apparatus of claim 5 in which the means for recovering comprises means for receiving an original data transmission clock signal.

7. The apparatus of claim 5 in which the means for recovering comprises means for deriving a clock signal from the entry data stream.

8. A method for reducing jitter in a data stream transmission along a physical communication channel in a token ring network, the token ring network having a plurality of station groups, each group having a plurality of stations, the data stream accumulating jitter during retransmission along a series of stations in a first group of said plurality of groups, the data stream entering the first group as an entry data stream, the data stream exiting from the first group as an exit data stream, the method comprising the steps of: receiving the exit data stream from a station;

storing said exit data stream;

selecting one data stream from said entry data stream or said exit data stream;

recovering a clock signal of said selected one data stream; and outputting the exit data stream as a jitter-reduced data stream at a timing defined by the recovered clock signal.

9. The method of claim 8 further comprising the step of monitoring the entry data stream and exit data stream to determine whether the first group includes an active monitor station, and in which the step of selecting includes selecting the exit data stream when said first group includes an active monitor and selecting said entry data stream when said first group does not include an active monitor.

10. The method of claim 9 in which said step of monitoring comprises:

comparing a source address and a return upstream address of an entry data stream serving as a claim token frame with a source address and a send upstream address of a previous exit data stream serving as a claim token frame;

wherein the changing of said entry data stream source address to equal said exit data stream source address and of said return upstream address to equal said send upstream address signifies that said first group includes an active monitor.

11. A token ring network having a plurality of groups of stations, a first group of stations receiving an entry data stream and outputting an exit data stream, the network comprising:

means for selecting one data stream from said entry data stream or said exit data stream as a source for recovering a clock signal;

means for recovering a clock signal of said selected one data stream; and means receiving said exit data stream for reducing jitter accumulating during transmissions along said first group of stations, said jitter reducing means outputting the exit data stream as a jitter-reduced data stream at a timing defined by the recovered clock signal.

12. The apparatus of claim 11 further comprising:

means for monitoring the entry data stream and exit data stream to determine whether the first group includes an active monitor station, and in which the means for selecting selects the exit data stream as the source for the recovered clock signal when said first group includes an active monitor and selects said entry data stream as the source for the recovered clock signal when said first group does not include an active monitor.

13. The apparatus of claim 12 in which said monitoring means comprises:

means for comparing a source address and a return upstream address of an entry data stream serving as a claim token frame with a source address and a send upstream address of a previous exit data stream serving as a claim token frame;

wherein the changing of said entry data stream source address to equal said exit data stream source address and of said return upstream address to equal said send upstream address signifies that said first group includes an active monitor.

14. An apparatus for determining whether an active monitor is present among a first group of stations along a token ring network that includes at least the first group and a second group of stations, the first group receiving an entry data stream and outputting an exit data stream, the apparatus comprising:

means for storing a first source address of an exit data stream which serves as a claim token frame;

means for comparing a second source address of a subsequent entry data stream which also serves as a claim token frame with said first source address;

means for indicating that said first group includes the active monitor when said second source address changes to equal said first source address.

15. A method for determining whether an active monitor is present among a plurality of stations along a token ring network, the first group receiving an entry data stream and outputting an exit data stream, the method comprising the steps of:

storing a first source address of an exit data stream which serves as a claim token frame;

comparing a second source address of a subsequent entry data stream which also serves as a claim token frame with said first source address; and indicating that said plurality of stations includes the active monitor when said second source address changes to equal said first source address.

16. A method for reducing jitter in a data stream transmission along a physical communication channel in a token ring network, the token ring network having a plurality of station groups, each group having a plurality of stations, the data stream accumulating jitter during retransmission along a series of stations in a first group of said plurality of groups, the data stream entering the first group as an entry data stream, the data stream exiting from the first group as an exit data stream, the method comprising the steps of:

receiving the exit data stream from a station;

storing said exit data stream;

selecting one data stream from said entry data stream or said exit data stream;

recovering a clock signal of said selected one data stream;

outputting the exit data stream as a jitter-reduced data stream at a timing defined by the recovered clock signal; and monitoring the entry data stream and exit data stream to determine whether the first group includes an active monitor station, and in which the step of selecting includes an active monitor selecting said entry data stream when said first group does not include an active monitor.

17. A token ring network having a plurality of groups of stations, a first group of stations receiving an entry data stream and outputting an exit data stream, the network comprising:

means for selecting one data stream from said entry data stream or said exit data stream as a source for recovering a clock signal;

means for recovering a clock signal of said selected one data stream;

means receiving said exit data stream for reducing Jitter accumulating during transmissions along said first group of stations, said jitter reducing means outputting the exit data stream as a jitter-reduced data stream at a timing defined by the recovered clock signal; and means for monitoring the entry data stream and exit data stream to determine whether the first group includes an active monitor station, and in which the means for selecting selects the exit data stream as the source for the recovered clock signal when said first group does not include an active monitor.

* * * * *